United States Patent [19]
Tozzi

[11] 3,808,709
[45] May 7, 1974

[54] CHILD TEACHING BOARD GAME

[76] Inventor: Vincenzo Tozzi, Via del Casaletto 35, Roma, Italy

[22] Filed: Dec. 7, 1972

[21] Appl. No.: 312,873

[30] Foreign Application Priority Data
Dec. 7, 1971    Italy .................................. 54607/71

[52] U.S. Cl............................. 35/35 H, 35/73, 35/75
[51] Int. Cl. ............................................... G09b 1/06
[58] Field of Search ........... 35/35 H, 60, 62, 71, 75, 35/31 D, 73; 40/106.1

[56] References Cited
UNITED STATES PATENTS

| | | | |
|---|---|---|---|
| 2,635,360 | 4/1953 | Bishop .................................... | 35/73 |
| 165,126 | 6/1875 | Shepherd ................................ | 35/62 |
| 3,520,072 | 7/1970 | Greenwood .......................... | 35/35 H |
| 388,486 | 8/1888 | Hall ........................................ | 35/73 |
| 3,172,214 | 3/1965 | Aberge et al. ................... | 35/35 H X |
| 3,654,712 | 4/1972 | Bagdasar .......................... | 35/35 H X |

FOREIGN PATENTS OR APPLICATIONS

| | | | |
|---|---|---|---|
| 6,696 | 1889 | Great Britain .......................... | 35/75 |
| 1,012,516 | 12/1965 | Great Britain ..................... | 35/35 H |

*Primary Examiner*—Wm. H. Grieb
*Attorney, Agent, or Firm*—McGlew and Tuttle

[57] ABSTRACT

A child teaching board game in the form of a rectangular thin box having on its front surface guideways for the insertion of slides provided with a plurality of panels each containing a figure representing a thing or animal well known to children and in the upper corners the initial letter of said thing or animal, a series of pigeon-holes below said guideways for receiving cards representing the same things and animals, and a viewer in the lower portion of said front surface for receiving and viewing said cards in any desired order while they are being illuminated by a source of light arranged therebehind.

6 Claims, 1 Drawing Figure

PATENTED MAY 7 1974
3,808,709
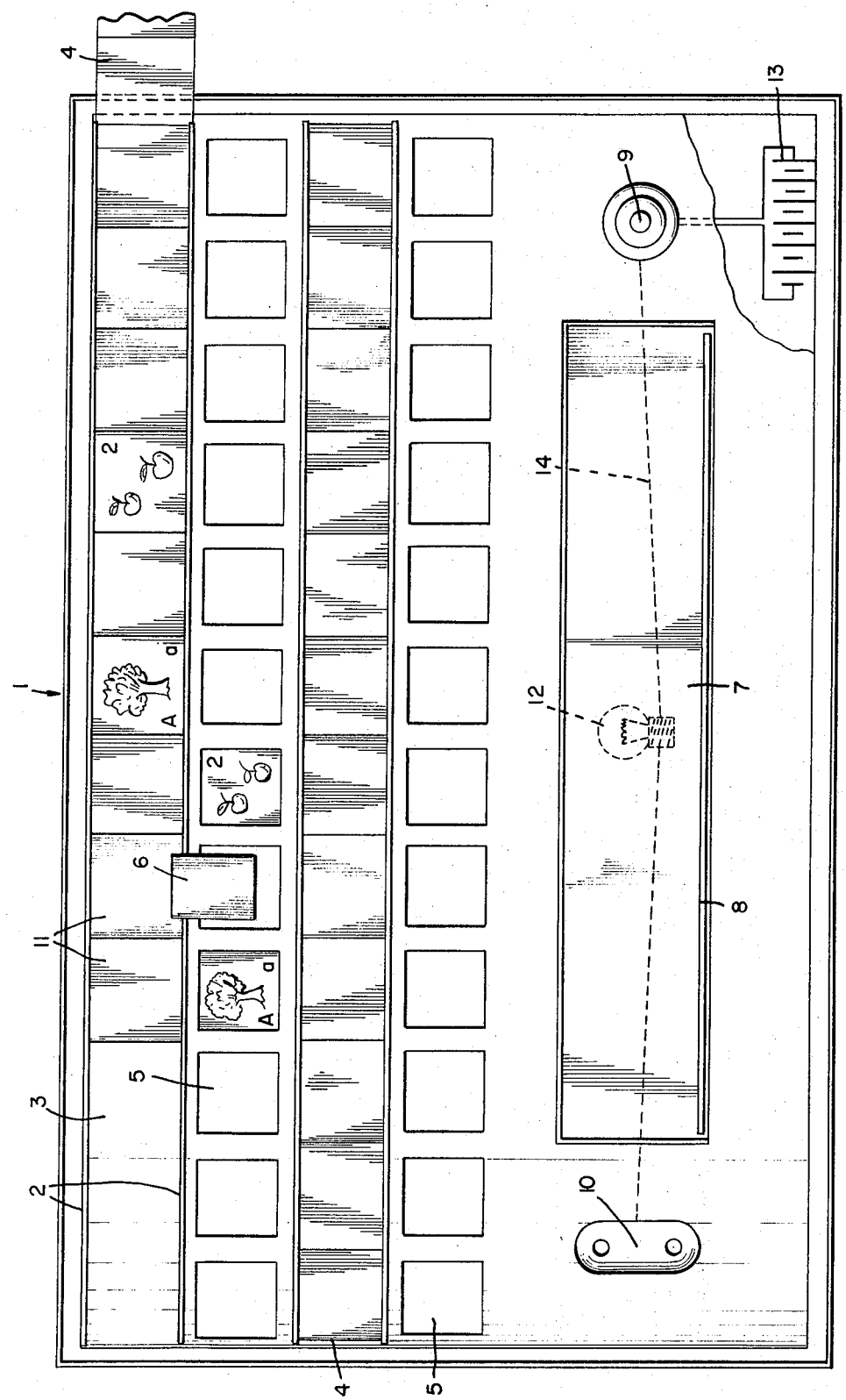

CHILD TEACHING BOARD GAME

This invention relates to a child teaching board game designed to help small children in learning to read and write and possibly reckon.

The first basic requirement for individual progress in any civil society, today established by compulsory education, is to learn to read and write. This first stage of man's learning is particularly hard and difficult since practically always the pupils are very young when they first learn to read and write. At this tender age the child usually has no wish to study or learn and only wants to play and enjoy himself although being eager to see and explore new things and examine how the toys work. Therefore, the first lessons should be given to the child according to teaching methods based on rules completely different from and opposed to those which are applied later, namely it is necessary to amuse the child, play with him, and rouse his curiosity with new easily exchangeable pictures which interest him.

This is achieved according to the invention by providing a child teaching board game which comprises a parallelepiped rectangular relatively thin box having on its front surface means for the insertion of elingated slides provided with a plurality of figures and characters, means for individually accommodating cards provided with the same figures and characters, and means for selectively receiving and viewing said cards in horizontal alignment and in a desired order.

A preferred embodiment of the invention will now be described by way of example and with reference to the accompanying drawing in which the only figure is a schematic illustration of the front side of the child teaching board game.

This child teaching board game comprises a relatively thin rectangular box made of wood or plastics material and indicated generally by 1 in the drawing. The front surface of the box 1 is provided with grooves 2 formed of the very material of the box upper surface and extending in parallel to the longer sides of the box 1. The grooves 2 are arranged in pairs to form guideways 3 for elongated slides 4 preferably of plastics material. The elongated slides 4 are slidably insertable and movable along the guideways 3 and can be exchanged as desired. Each elongated slide 4 carries a plurality of figures or drawings. One of the elongated slides 4, the upper one in the drawing, is shown in the partially withdrawn position.

In the illustrated preferred embodiment there are four grooves 2 forming two guideways 3 for two elongated slides 4. Each of the elongated slides 4 is divided into a plurality of panels 11 each carrying one figure or drawing and, for example, a capital letter and the same printed small letter, or a number. In the illustrated embodiment there are twelve panels 11 on each elongated slide 4, making a total of 24 panels on the two slides, which corresponds to the number of letters in the Italian alphabet. To accommodate the letters of the English alphabet there would be two more panels 11 on each slide 4. Further, additional panels could be provided to accommodate groups of consonants.

Arranged below the guideways 3 in the upper surface of the box 1 are pigeon-holes 5 corresponding in number to the number of the panels 11 on the slides 4. The pigeon-holes 5 serve to accommodate removable cards 6 preferably made of plastics material and each carrying the same figure or drawing and the same letters or numbers as the associated adjacent panel 11.

Finally, the front surface of the box 1 is provided near its lower end with a rectangular recess extending with its longer sides in parallel to the longer sides of the box 1 and covered with frosted glass or some equivalent translucent plate of plastics material to form a viewer 7 on which the cards 6 may be placed and viewed, the cards 6 being retained at their lower end by a flat elongated spring-biased rod 8 secured to and extending along the lower edge of the viewer 7. The cards 6 may be placed on the viewer 7 in any desired order different from that of the panels 11 on the elongated slides 4. Arranged in the rectangular recess below the frosted glass or plastics plate of the viewer 7 is one or more electric bulbs which through a push-button switch 9 are connected to an electric power supply such as a battery or by means of a plug socket 10 to the general electric power supply system.

Having thus described the arrangement of the child teaching board game its use will now be described as follows:

The figures or drawings on the panels 11 of the two slides 4 show things or animals well known to a child. The names of these things or animals are clearly repeated several times by the teacher. The first letter of these things or animals, which may be a vowel or consonant, is written according to the global teaching method as a capital letter in one upper corner and as a small letter in the other upper corner of each panel 11. So the first panel 11 may show, for example, an apple and in the upper corners of this panel will appear the vowel $a$ written A and $a$, respectively; the second panel may show a bed and in its upper corners there will be written B and $b$, the third panel may show a cat and in its upper corners there will be written C and $c$, and so on.

First the child will amuse himself by looking at the figures illustrated on the panels 11 of the slides 4 and almost without noticing it the child will learn to associate the names of the things or animals illustrated on the panels, which names the teacher is repeating to the child. Simultaneously also the letters contained in the corners of the panels become impressed upon the mind of the child so that he will associate the letters A and $a$ to the word "apple," B and $b$ to the word "bed," and so on.

Then the child may begin to amuse himself with the cards collected in the pigeon-holes 5, looking at them and noticing that they carry the same figures as the panels 11 of the slides 4 and also the same vowels and consonants. Then the child may place the cards 6 on the viewer 7 in the same order or in a different order as the panels 11 on the slides 4, looking at them while they are being illuminated from below by the electric bulbs through the frosted glass plate on the viewer while pressing down the push-button switch 9 to close the electric circuit to the battery or the general electric power supply system through the plug socket 10.

After the child has become familiar with the use and observation of the cards 6 and the figures and letters shown thereon as well as with their pronunciation and the succession of vowels and consonants in each word, the child may finally find that, for example, the word "angel" may be composed by putting together the first letters of the cards "Apple," "Nut," "Garden," "Elephant" and "Lion." So without noticing it the child has gradually learned to compose words with the same ease as with the global teaching method but with less effort and enjoying it.

By placing a sheet of semitransparent paper on the cards arranged on the viewer or by using cards having perforated letters the child may copy with a pencil on the sheet of paper the letters written in the upper corners of the cards, thus forming the corresponding words. Then it is easy to continue teaching the child and to proceed to the first elements of arithmetic by using slides and cards on which each single thing or animal in the continuous series of pictures is illustrated once, twice, thrice and up to twelve times and on each panel of the slides and each card the number of the illustrated things or animals is indicated. From this first notion of arithmetic it is then easy to proceed to the concept of addition and subtraction and then with a slightly greater but still tolerable effort to the concepts of division and multiplication.

Evidently each of the proposed child teaching board games will be supplied with a sufficiently large number of slides and corresponding cards which can be accommodated in the interior of the game box. The number of the slides and cards can be increased as desired so that there is no limit to the number of pictures or figures as required by the global teaching method and in this manner the child's interest in the teaching game can always be kept alive and its enjoyment in the game be increased.

Although a preferred embodiment of the invention has been described herein in detail and illustrated in the accompanying drawing, it is to be understood that the invention is not limited to this precise embodiment and that numerous changes and modifications may be made therein without departing from the scope of the invention.

I claim:

1. A child teaching board game comprising a parallelepiped rectangular relatively thin box having on its front surface means for the insertion of elongated slides provided with a plurality of figures and characters, means for individually accommodating cards provided with the same figures and characters, and means for selectively receiving and viewing said cards in horizontal alignment and in a desired order, said means for selectively receiving and viewing said cards is a viewer formed by a rectangular recess arranged in the lower portion of the front surface of the board game and extending with its longer sides in parallel to the longer sides of the latter, said rectangular recess accommodating at least one electric light bulb connectable through switch means on the front surface of the board game to a source of electric power, said rectangular recess being covered by a plate of translucent material, said cards provided with figures and characters being arranged to be placed on said plate of translucent material to be viewed and being kept in position thereon by a flat elongated spring-biased rod extending along the lower edge of said viewer.

2. A child teaching board game as claimed in claim 1, wherein said switch means for connecting said electric light bulb in said rectangular recess to said source of electric power is a push-button switch and said source of electric power is a battery.

3. A child teaching board game as claimed in claim 1, wherein a plug socket is provided on the front side of the board game for connection to an electric power supply system and said switch means is a push-button switch for connecting said electric light bulb in said rectangular recess to the electric power supply system.

4. A child teaching board game as claimed in claim 1, wherein said means for the insertion of elongated slides comprises a plurality of grooves extending in pairs in parallel to the longer sides of the board game on the front surface thereof so as to form guideways for slidably receiving said elongated slides, said elongated slides carrying a plurality of panels each provided with a figure and characters, and said means for individually accommodating said cards comprises a plurality of pigeon-holes arranged in a series in parallel to and below said guideways for said elongated slides, each of said cards showing on its front side the same figure and characters as the associated adjacent panel on said elongated slides.

5. A child teaching board game as claimed in claim 4, wherein each of said panels on said elongated slides and each of said cards carries a figure illustrating a thing or animal very familiar to small children and the initial letter of said thing or animal is shown as a capital letter and a small letter in the upper corners of said panels and cards.

6. A child teaching board game as claimed in claim 4, wherein each of said panels on said elongated slides and each of said cards carries one or more figures and the number of figures is indicated by the corresponding cipher in an upper corner of said panels and cards.

* * * * *